Fig. 1

INVENTOR
CLARENCE W. VOGT
BY
Mason, Porter, Diller & Stewart
ATTORNEYS

May 14, 1968

C. W. VOGT 3,382,644

APPARATUS FOR AND METHOD OF CONTINUOUSLY
FORMING AND FILLING BAGS

Filed Dec. 30, 1963

INVENTOR
CLARENCE W. VOGT

BY
Mason, Porter, Diller & Stewart
ATTORNEYS

United States Patent Office 3,382,644
Patented May 14, 1968

3,382,644
APPARATUS FOR AND METHOD OF CONTINUOUSLY FORMING AND FILLING BAGS
Clarence W. Vogt, Box 232, Westport, Conn. 06880
Filed Dec. 30, 1963, Ser. No. 334,257
20 Claims. (Cl. 53—29)

ABSTRACT OF THE DISCLOSURE

This subject has to do with an apparatus and method for continuously forming bags, filling the bags and sealing the same. In accordance with this invention, a continuous web is moved in a vertical path and is folded, followed by the formation of horizontally disposed open bags therefrom. The individual bags are then transferred to a horizontal path of movement while being held open. Next the bags are filled, followed by the re-shaping of the bags and the sealing thereof.

This invention relates in general to new and useful improvements in the packaging art, and more particularly to a novel apparatus for and the method of taking a continuous web and continuously forming therefrom bags which are then filled in a continuous operation.

It is well known to provide a continuous web and form bags therefrom. However, present apparatus for this purpose is deficient in several aspects. In the first place, the bags are formed in the flat and, therefore, must be opened for receiving the product to be placed therein. Secondly, since the bags are formed in the flat, the only practical way of supporting the bags during the filling thereof is along one edge of each bag. This does not provide the necessary support for retaining the bag in an upstanding position and when a product is placed therein, there is a tendency for the bag to twist, thus making the sealing of the open end thereof very difficult. Thirdly, because the bags are formed in the flat and are immediately transferred to a filling apparatus, it is extremely difficult to obtain the necessary space in between bags, as is required in many filling operations. Fourthly, existing bag forming and filling apparatus are very long due to the nature of the apparatus which must be in a continuous straight line and because of the fact that the bags are very closely spaced, thereby requiring a complicated filling mechanism.

In accordance with this invention, it is proposed to provide a novel apparatus wherein bags are continuously formed from a web and immediately thereafter filled, the apparatus being relatively short as compared to existing apparatus and overcoming the four above named deficiencies of present apparatus.

It is a primary object of this invention to provide a novel bag forming and filling apparatus wherein a web is continuously fed substantially vertically and during this vertical movement of the web, it is sealed at spaced intervals and separated into separate bags, after which the bags are transferred from the vertical to the horizontal and immediately thereafter filled, the novel arrangement of the bag forming apparatus and bag filling apparatus being such that the entire apparatus is very compact as compared to the in-line bag filling and forming apparatus presently in use.

Another object of the invention is to provide novel bag forming and filling apparatus wherein a continuous web is formed, and bag formers are placed within the web after the web has been shaped to be of a generally U-shaped cross section, followed by the sealing of the web on opposite sides of each former and the severing of each so formed bag from the remainder of the web whereby the bag, when formed, is opened and, therefore, the necessity of providing apparatus for the later opening of bags is eliminated.

Still another object of this invention is to provide a novel apparatus for forming bags from a continuous web wherein each bag is formed about a former so that when the bag is initially formed it is in its open state, and the bag, when transferred from its former has a large bottom area by means of which the bag may be properly supported by a carrier and retained in an upright open state for the reception of a product and wherein the open upper end of the bag remains horizontal for ease of sealing the same after the filling thereof.

A further object of this invention is to provide a novel bag forming apparatus for use with a bag filling apparatus, the bag forming apparatus being of a nature wherein an endless web is fed thereto after which the web is formed to a U-shape and has received therein formers about which the web is shaped to define open bags, the bags being severed from the web and being carried by the formers and transferred from the formers to carriers in a manner wherein the bags, which were formed immediately adjacent each other, can be spaced apart in accordance with the requirements of an associated filling apparatus.

Still another object of this invention is to provide a novel method of forming and filling bags wherein a continuous web is supplied and is generally preferred to be of a U-shaped cross section, after which the web is shaped about formers and sealed on the opposite sides thereof, followed by the severing of the web at spaced intervals to define a plurality of open bags, the open bags then being transferred and spaced apart while being held in their open condition, followed by the filling of the bags and the final sealing thereof.

Another object of this invention is to provide a novel apparatus for forming bags wherein the bags are formed in their open condition positioned on formers, and the formers pass along an arcuate path during the transfer of the bags to a carrier mechanism, and the formers being extensible to vary the radius of the arcuate path whereby the spacing between bags at the time of transfer may be varied in accordance with the requirement of the filling apparatus associated with the bag forming apparatus.

Still another object of this invention is to provide a novel apparatus for continuously forming and filling bags wherein, in a continuous operation, bags are formed and filled, followed by the sealing of the filled bags, the apparatus being of a nature wherein the bags may be orderly delivered for further collating and packaging in other types of containers.

A further object of this invention is to provide a novel apparatus for continuously forming bags which is particularly adapted for use in conjunction with a differential gaseous pressure filling apparatus wherein bags, which are continuously formed in an open condition, may be filled in a dust-free operation and wherein an accurately measured fill may be placed into each bag.

With the above and other objects in view that will hereinafter appear, the nature of the invention will be more clearly understood by reference to the following detailed description, the appended claims and the several views illustrated in the accompanying drawings.

Figure 1:
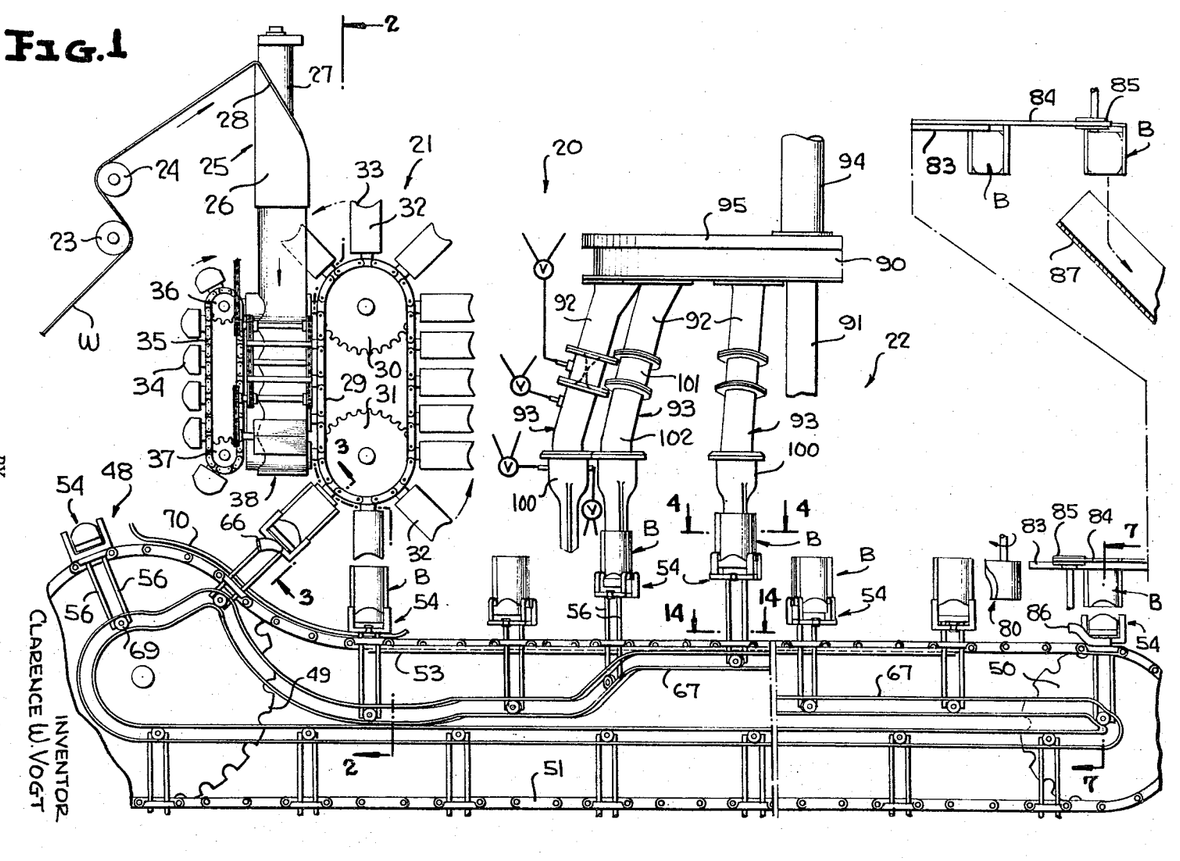
FIGURE 1 is a schematic side elevational view of the bag forming and filling apparatus which is the subject of this invention and shows the general details thereof.

Referring now to the drawings in detail, reference is first made to FIGURE 1 wherein the general details of the apparatus of this invention are shown. The apparatus is generally referred to by the numeral 20 and is formed primarily of a bag forming apparatus, generally referred to by the numeral 21, and a bag filling apparatus, generally referred to by the numeral 22. The complete details of the bag forming apparatus 21 will be set forth first.

In accordance with this invention a continuous web W is provided. The web W may be of any desired heat sealable composition. For example, it may be a polyethylene coated paper, or the web may be formed entirely of polyethylene. Other plastics may be utilized.

The web W is passed around a pair of tensioning rolls 23 and 24 to a former, generally referred to by the numeral 25. The former 25 is vertically disposed and includes an outer former member 26 and an inner mandrel 27. The former 26 and the mandrel 27 are supported in any desired manner. The former member 26 is provided with an oppositely facing edge 28 over which the web W is reversely turned and is caused to assume a generally U-shaped horizontal cross section with the apex of the cross section being generally rounded.

The bag forming apparatus includes a vertically disposed endless conveyor 29 which is carried by a pair of vertically spaced sprockets 30 and 31. The conveyor 29 carries a plurality of equally spaced internal bag formers 32. Each bag former 32 is provided with a concaved free end 33 for the purpose of shaping the bottom of a bag. The path of movement of the internal bag formers 32 is such that a portion thereof is coextensive with the vertical path of the folder web W. It is to be noted that when the movement of the internal bag formers 32 is coextensive with that of the web W, the formers 32 are closely spaced so that bags may be continuously formed from the web W without waste.

The internal bag formers 32 have associated therewith external bag bottom formers 34 which have free ends configured for cooperation with the free ends 33 of the bag formers 32 to provide for an inwardly concavely shaped bag bottom which will be described in more detail hereinafter. The external formers 34 are carried by an endless conveyor 35 which is supported by a pair of vertically spaced sprockets 36 and 37. It is to be noted that the path of movement of the external formers 34 includes a portion wherein the external formers 34 are in alignment with like ones of the internal formers 32 and cooperate therewith to clamp portions of the web therebetween.

It is to be noted that when the web W, after being folded to assume a V-shaped cross section, passes downwardly from the former 25, the internal formers 32 pass into the interior of the web W and then the external formers 34 are brought into cooperating alignment with the internal formers 32 to form shaped bag bottoms and to clamp the web W between the formers 32 and 34. This clamped engagement of the web assures the proper relationship of the formers 32 and 34 with respect to the web.

After the web has been clamped by the formers 32 and 34, the web is heat sealed together on opposite sides of each of the formers 32. This is accomplished by a heat sealing apparatus, generally referred to by the numeral 38 and best shown in FIGURE 2. The heat sealing apparatus 38 includes a pair of endless conveyors 40 and 41 which are disposed on opposite sides of the vertical path of the folder web W. The conveyors 40 and 41 carry a plurality of heat sealing elements 42 and 43, respectively which come into engagement with the web and press the same inwardly between the internal formers 32. It will be noted that the heat sealing elements 42 and 43 have the dual function of shaping the web tightly about the internal formers 32 and sealing together intermediate web portions as they come into contact between the adjacent internal formers 32.

Figure 2:
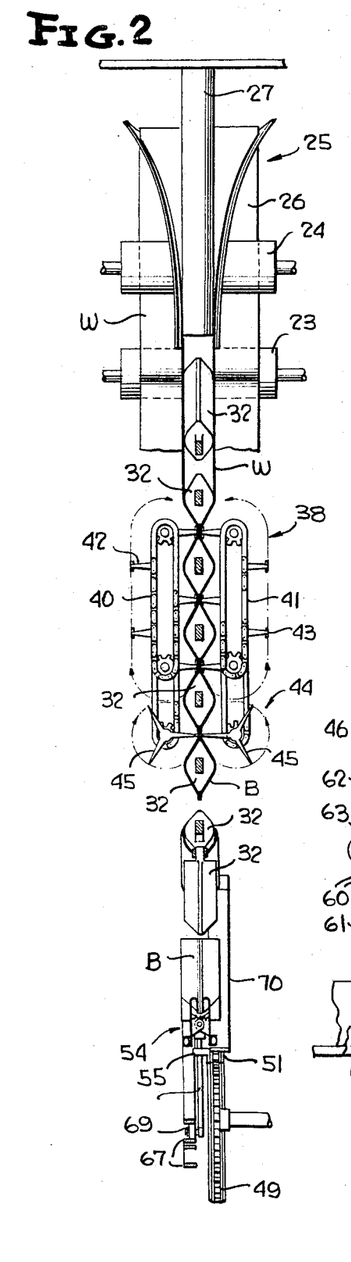
FIGURE 2 is an enlarged vertical sectional view taken along the line 2—2 of FIGURE 1 and shows specifically the details of the bag forming and transferring apparatus.

After the web W has been heat sealed on opposite sides of each of the internal formers 32, the heat seal formed between each adjacent path of internal formers 32 is severed by suitable severing apparatus, generally referred to by the numeral 44. The severing apparatus includes a plurality of rotating blades 45 which are arranged in a generally star-shaped pattern and which cooperate with one another to sever the web intermediate each two adjacent formers 32. Each time the web W is severed, a bag B is formed and this bag is in its open condition and carried by one of the internal formers 32.

At this time it is pointed out that any suitable conventional drive mechanism may be provided for driving the endless conveyors 29, 35, 40 and 41 in timed relation. In a like manner, the rotating blades 45 are driven in timed relation so that there is complete cooperation between the internal formers 32, the external formers 34, the heat sealing elements 42 and 43 and the rotating blades 45. Since the drive means for these various components in itself is not a part of the invention, it has not been shown.

Figures 8, 9, 10, 11:
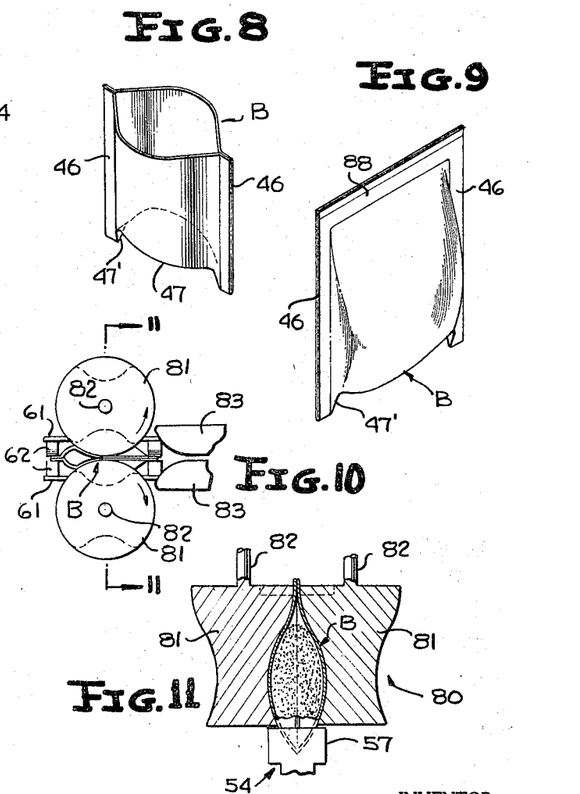
FIGURE 8 is a top perspective view of a bag as it appears at the time of forming and subsequent to the placing of a product therein.
FIGURE 9 is a top perspective view on a slightly larger scale than FIGURE 8 and shows a filled and completely sealed bag.
FIGURE 10 is a fragmentary plan view of the bag reforming apparatus and shows the manner in which the upper portion of a bag is flattened prior to the sealing thereof.
FIGURE 11 is a fragmentary vertical sectional view taken along the line 11—11 of FIGURE 10 and further shows the details of the bag reforming apparatus and the manner in which the same functions.

Reference is now made to FIGURE 8 wherein one of the bags B is illustrated. It is to be noted that the bag B has a pair of side tabs 46 which result from the heat sealing together of the web on opposite sides of an associated internal former 32 in the forming of the bag B. It is also to be noted that the bag B has an inwardly recessed concavely shaped bottom 47. The shaped bag bottom has end portions of a generally triangular configuration which are sealed to adjacent portions of the bag body as at 47', these sealed portions merging with the seals of the side tabs 46 and being formed by projections on the sealing bars 45 which cooperate with surfaces on the external formers 34. This particular shape of bottom configuration eliminate corners of the type which normally require the waste of material and in which a product may be trapped. In addition, this particular shape of bottom 47 aids in the proper supporting of the bag B during the handling and filling thereof while retaining the bag in its open condition. Further, the particular contour of the bottom 47 facilitates the filling thereof utilizing a pressure differential filling apparatus in a manner to be described hereinafter.

After the bags B have been formed, they are transferred to an endless conveyor, generally referred to by the numeral 48. The endless conveyor 48 includes a pair of sprockets 49 and 50 about which there is entrained a chain 51. At least one of the sprockets 49 and 50 is driven in timed relation to the driving of the bag forming apparatus 21 so that the endless conveyor chain 51 is driven at a predetermined rate in timed relation to the movement of the internal formers 32.

Figures 13, 14, 15:
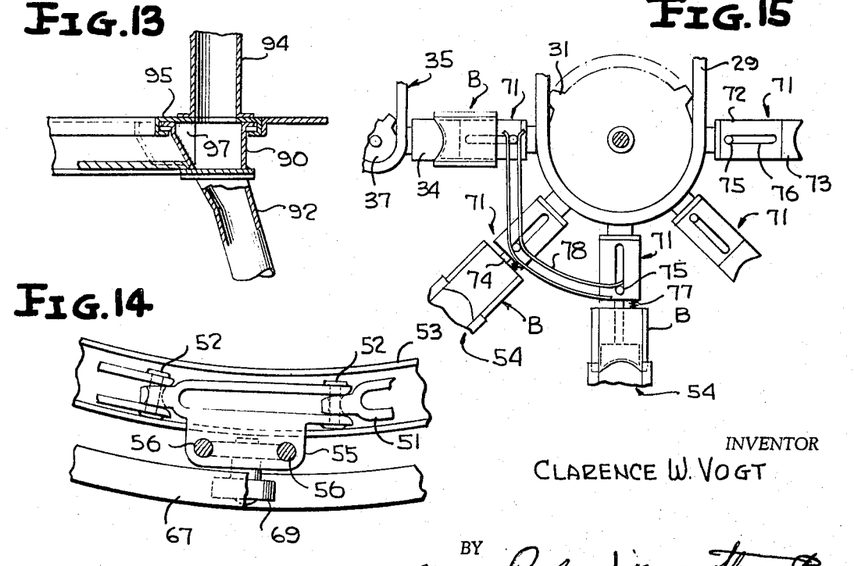
FIGURE 13 is an enlarged fragmentary vertical sectional view taken along the line 13—13 of FIGURE 12 and shows the specific manner in which a product is delivered to a distributing ring and from the distributing ring to an individual filler.
FIGURE 14 is an enlarged fragmentary horizontal sectional view taken along the line 14—14 of FIGURE 1 and shows the specific details of the mounting of one of the bag carriers and the associated inner chain for transporting the same.
FIGURE 15 is a schematic elevational view of the lower portion of the bag forming apparatus and shows a modified form of bag former which is extensible for the purpose of controlling the spacing between adjacent bags at the time of the transfer thereof to carriers.

The endless conveyor chain 51, as is best shown in FIGURE 14, is of a special design wherein the individual links are so connected by means of pins 52 whereby the links are free to not only pivot about horizontal axes to pass around the sprockets 49 and 50, but also pivot slightly about vertical axes to pass through a horizontal arcuate path as is required in conjunction with the filling apparatus 22. The movement of the endless conveyor chain 51 in a horizontal arcuate path is controlled by means of a channel-shaped track 53.

Figures 3, 4, 5:
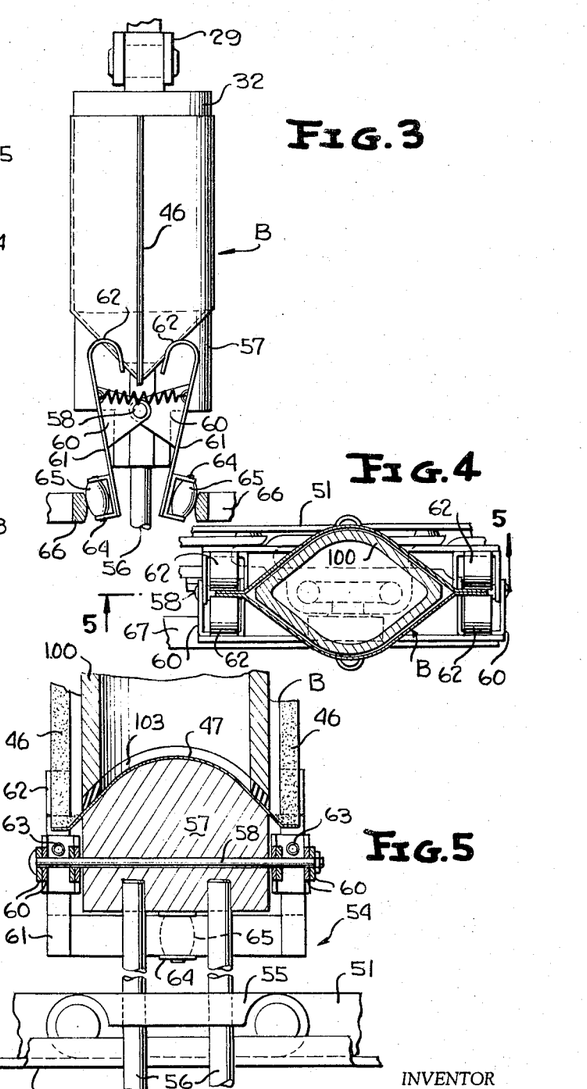
FIGURE 3 is an enlarged fragmentary transverse sectional view taken generally along the line 3—3 of FIGURE 1 and shows in elevation a bag at the time it is being transferred from a bag former to a carrier.
FIGURE 4 is an enlarged fragmentary horizontal sectional view taken along the line 4—4 of FIGURE 1 and shows a bag in position for having a product placed therein.
FIGURE 5 is an enlarged fragmentary longitudinal vertical sectional view taken along the line 5—5 of FIGURE 4 and shows the specific relationship of means for supporting the bag at the time of filling thereof and the manner in which a filling nozzle is temporarily sealed with respect to the bottom of the bag for the purpose of effecting an accurate filling of the bag with a predetermined weight of product.
Figure 6:
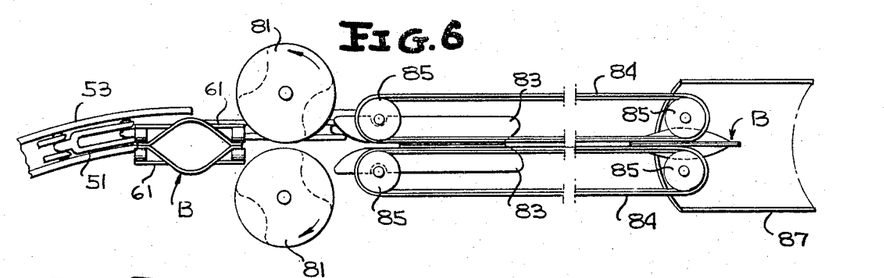
FIGURE 6 is a plan view of the terminal portion of the apparatus on a large scale and shows the manner in which filled bags are reformed and sealed.

The endless conveyor chain 51 carries a plurality of bag carriers which are generally referred to by the numeral 54. The bag carriers 54 are equally spaced with the spacing thereof being in accordance with the spacing of the bags delivered by the bag forming apparatus 21 and the requirements of the filling apparatus 22. In FIGURES 2, 5 and 14 it is clearly shown that each bag carrier 54 is secured thereto a bag support 57 which is configurated mounting plate 55 which is secured to certain of the links of the conveyor chain 51 and projects to one side thereof. Each mounting plate 55 carries for relative vertical movement a pair of support rods 56 which are slidable through the mounting plate 55. The upper ends of the rods 56 have secured thereto a bag support 57 which is configurated very similar to the configuration of the external bag formers 34. Thus, the bag support 57 has an upper support surface which conforms to the contour of the bag bottom 47. The bag support 57 serves both as an ample support for the bag B that may be associated therewith and the product placed therein and as means for assuring the maintaining of the concavely curved configuration of the bag bottom 47.

The bag support 57 has a horizontal shaft or pin 58 extending therethrough. The shaft or pin 58 has pivotedly mounted on opposite ends thereof wings 60 of a pair of bag clamps 61. Each bag clamp 61 is generally U-shaped in outline and includes a pair of reversely turned upper fingers 62. The fingers 62 of each pair of bag clamps 61 are in opposed relation and are positioned for clamping therebetween lower ends of the side seams or tabs 46 of an associated bag B. The bag clamps 61 are urged together into clamping relationship by a pair of tension springs 63 at opposite ends thereof, as is best shown in FIGURES 3 and 5.

In order to facilitate the opening of the bag clamps 61, the lower portion of each bag clamp 61 is provided with a small support 64 carrying a cam follower 65. It is to be understood that the bag clamps 61 need be opened only when a bag is to be positioned therebetween and when a bag is to be discharged therefrom. The cam followers 65 are engageable with suitable cams for accomplishing this. In FIGURE 3 there are illustrated cams 66 for opening the bag clamps 61 at the time of the positioning of an empty bag on the bag support 57 of the associated carrier 54.

Figure 7:
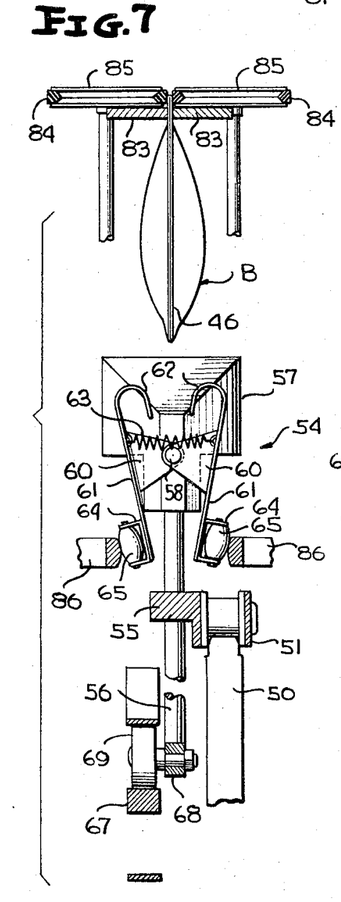
FIGURE 7 is an enlarged fragmentary transverse vertical sectional view taken generally along the line 7—7 of FIGURE 1 and shows the specific manner in which the bags have the open ends thereof sealed following the placing of a product within the bags.

At this time it is also pointed out that the position of the individual carrier 54 relative to the endless conveyor chain 51 is also controlled by means of a cam which is in the form of an endless track 67. The cam track 67 is best illustrated in FIGURE 1. The lower ends of the rods 56, as is best shown in FIGURE 7, are connected together by a bar 68 which carries a cam follower 69 that rides in the cam track 67.

The transfer of the newly formed bags B from the internal bag formers 32 to the carriers 54 is carried out in a simple and expeditious manner. Referring now to FIGURE 1, it will be seen that as the bag formers 32 carrying bags B pass around the lower portions of the sprocket 31, the spacing between the bottoms of the bags greatly increases. This spacing is solely dependent upon the distance of the bag bottom from the center of the sprocket 31 and the diameter of the sprocket 31. Thus, by increasing or decreasing the diameter of the sprocket 31 the spacing of the bags at the time of transfer from the internal bag formers 32 to the carriers 54 may be controlled. Furthermore, by shifting the bottoms of the bags outwardly with respect to the center of rotation of the sprocket 31, the spacing may be increased. This is disclosed in more detail hereinafter.

As will be readily apparent from FIGURE 1, at the time a bag is being transferred from its associated internal bag former 32 to an associated carrier 54, the endless conveyor chain 51 is passing along an arcuate path which has as its center the center of the sprocket 31. This is accomplished by means of a curved guide 70. Thus, at the time a bag B is being transferred from an internal former 32 to one of the carriers 54, the internal former and the carrier are in alignment and move together along the same path.

It is to be noted that the cam track 67 is of a configuration whereby each carrier 54 comes into radial alignment with its associated internal former 32, after which the carrier 54 is projected toward and into engagement with the bag carried by the internal former. At the time the carrier 54 is outwardly projected, the bag clamps 61 are held in their open positions by means of the cams 66. Immediately after the bottom of the bag being transferred is clamped between the bag support 57 of the carrier 54 and the outer end 33 of the internal former 32, the cam followers 65 ride off the cams 66 and the bag to be transferred is tightly gripped by the fingers 62 of the bag clamps 61. Then, as the bag B, the internal former 32, and the carrier 54 move in unison, the carrier 54 is retracted away from the internal former 32 and the bag B is stripped from the internal former 32. However, because of the particular shape of the bag support 57 and the manner in which it is engaged by the bag clamps 61, it will be seen that the bag is retained in its open position ready for receiving a product.

At this time it is pointed out that the spacing of the carriers 54 along the endless conveyor chain 51 is in accordance with the spacing of the outer ends 33 of the internal formers 32 as they pass around the sprocket 31. It will be readily apparent that should the diameter of the sprocket 31 be reduced, the distance from the center of the sprocket to the outer end 33 of the internal former 32 will be reduced. Further, it will be readily apparent that the angle between adjacent internal formers will be increased. However, the increase in spacing due to the increase in angle will more than offset the decrease in radius and the spacing between adjacent bag bottoms will be increased. In like manner, when the diameter of the sprocket 31 is increased the spacing will be decreased. A further change in bag bottom spacing may be obtained by making the internal former extensible. With respect to this, reference is made to the modification shown in FIGURE 15 wherein a modified form of internal former, generally referred to by the numeral 71, is shown. The internal former 71 includes a main body portion 72 which is suitably attached to the endless conveyor 29. The internal former 71 also includes an outer end portion 73 which is carried by a shaft 74 slidably mounted within the main body portion 72. The shaft 74 is provided at its inner end with a pin 75 that extends generally normal to the shaft 74.

The pin 75 extends through an elongated slot 76 in the main body portion 72 and serves to prevent rotation of the outer end portion 73 relative to the main body portion 72. A suitable tension spring 77 extends between the main body portion 72 and the outer end portion 73 and normally holds the two in abutting engagement with one another, as is shown in the right hand part of FIGURE 15.

There is associated with the internal formers 71 a cam track 78 which receives a projecting end portion of the pin 75. The cam track 78 is configurated to project the outer end portion 73 outwardly away from the main body portion 72 prior to the time that the internal former 71 comes into alignment with one of the carriers 54. Thus, the bottom of the bag B is urged further away from the axis of rotation of the sprocket 31 and the spacing of the bags is increased in accordance with the amount of projection of the outer end portions 73. This is, of course, controlled by the configuration of the cam track 78. It is to be understood that as soon as the pin 75 rides out of the cam track 78, the return spring 77 will immediately withdraw the outer end portion 73 and aid in the stripping of the bag B from the internal former 71.

It will be readily apparent that the bag received by each carrier from the bag forming apparatus 21 is properly supported for the reception of a product. Since the bottom of the bag is resting firmly on the bag support 57, it will be seen that the weight of a product placed within the bag B will be borne by the bag support 57 and it is merely necessary for the bag clamps 61 to retain the bag B in its upright position. The necessary filler is placed into the open bag B by the filling apparatus 22 in an automatic manner to be described hereinafter, after which the filled bags are reformed and then sealed. In order to effect the reforming of the bags B after the product has been placed thereinto, there is disposed along the upper one of the endless conveyor chains 21 a bag reforming apparatus which is generally referred to by the numeral 80. The bag reforming apparatus 80, as is clearly shown in FIGURES 10 and 11, includes a pair of reforming members 81 which are carried by and driven by vertical shafts 82. The reforming members 81 are rotated in timed relation to the movement of the carriers 54 and serves both to narrow the lower portion of the bag so as to force the contents of the bag upwardly and outwardly and at the same time squeezes the upper portion of the bag to exclude air therefrom and to bring together the opposite walls of the bag at the upper portion thereof to facilitate the sealing together of the walls. It is to be understood that at the time the bag is being reshaped, it is continued to be supported and carried by an associated carrier 54.

After the filled bag B has passed through the bag reformer 80, it is ready for sealing. The closed upper portion of each bag B passes between a pair of heat sealing rails 83 which are disposed slightly below the plane of a pair of opposed endless belts 84. The endless belts 84 are carried by suitable pulleys 85 and have opposed runs. The belts 84 grip the extreme upper edges of the bags B and serve to both support the filled bags and transport the same along the heat sealing rails 83. It is to be noted that there is disposed below the heat sealing rails 83 a cam 86 which is engageable with the cam followers 65 to effect the opening of the bag clamps 61 and permit the releasing of the filled bags from the carriers 54. At the time the bag clamps 61 are opened, the carrier 54 is suddenly lowered due to the configuration of the cam track 67. Thus, the filled bag B is completely released from an associated one of the carriers 54. It is to be understood that the sealing rails 83 are of sufficient length to effect the necessary heat sealing of the opposed walls of the bag B together. After the termination of the sealing rails 83, the bag B is continued to be supported by the belts 84 until the fused seal has had sufficient time to set. Then as the belts 84 pass around the pulleys 85 at the right hand end of the belt runs, as is shown in FIGURE 1, the filled and sealed bags B are released and they drop onto a chute 87. The shape of the filled and sealed bags B is clearly shown in FIGURES 7 and 9 with the top heat seal being referred to by the numeral 88.

At this time it is pointed out that when the bags B are relatively large and the weight of the product carried thereby is relatively great, it may be desirable for the endless conveyor 48 to extend beneath the entire heat sealing operation and for a sufficiently additional length to permit the proper cooling of the heat seal 88. Furthermore, it is to be understood that there may be associated with the chute 87 means for collating or otherwise gathering into neat groups of a predetermined number the bags B for the placing thereof into other containers for handling and shipment.

Figure 12:
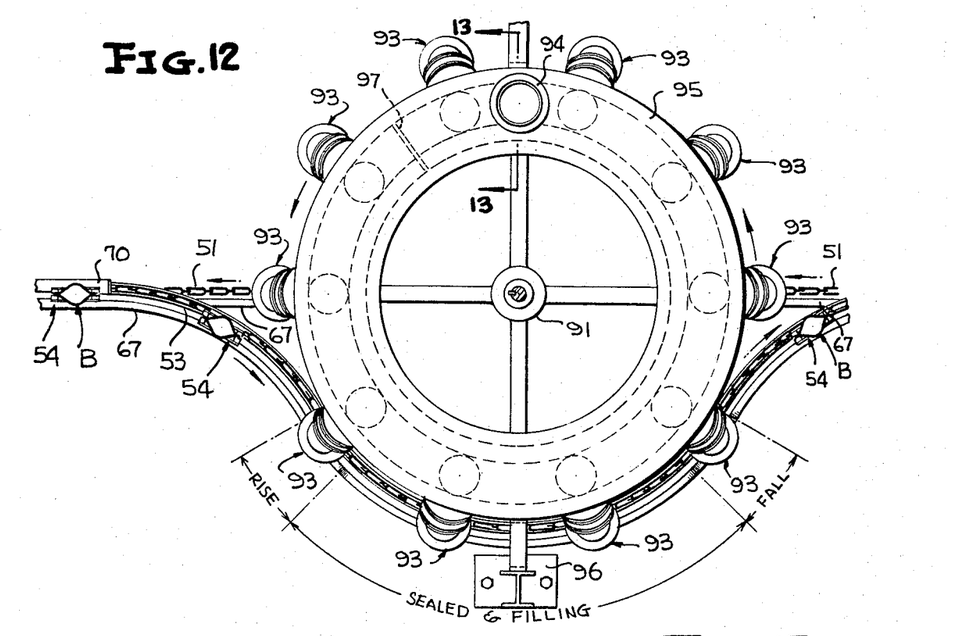
FIGURE 12 is a fragmentary plan view of the filler portion of the apparatus and shows the specific manner in which bag carriers are associated with the filling apparatus.

Reference is now made to FIGURES 1, 12 and 13 wherein it will be seen that the filling apparatus is of the turret type and includes an annular trough 90 which is mounted for rotation on a vertical shaft 91. The annular trough 90 has secured to the underside thereof a plurality of conduits 92 which receive the product to be placed in the bags B from within the trough 90. To each of the conduits 92 there is coupled a suitable filling mechanism which is generally referred to by the numeral 93. It is to be understood that the filling mechanisms 93 are spaced in accordance with the spacing of the carriers 54 and that the annular trough 90 is rotated in timed relation to the movement of the endless conveyor belt 51. It is also to be noted that the guide track 53 is configurated so that the open bags B carried by the carriers 54 are disposed in vertical alignment with the filling mechanisms 93.

The product to be placed within the bags B is distributed to the filling mechanisms 93 by first being delivered to the annular trough 90 by means of a delivery conduit 94 which is secured to a fixed cover 95 for the trough 90. The cover 95 is supported in any desired manner including by means of a suitable support 96 illustrated in FIGURE 12. The trough 90 has secured to the underside thereof a wiper 97 which rides within the trough 90 and causes there to be an accumulation of the product to be dispensed so that the passage of a sufficient amount of the product into each of the conduits 92 as it passes under the space between the supply conduit 94 and the wiper 97 is assured.

Each of the filling mechanisms 93 includes a dispensing nozzle 100 which is of a slightly tapered configuration and which is configured for the reception in an open bag B. Depending upon the product to be dispensed, any suitable type of measuring valve may be disposed between the conduit 92 and an associated nozzle 100. As far as this invention is concerned, the filling apparatus 22 may be utilized for dispensing any type of product including a liquid, a finely divided granular product, and larger chunks such as pellets and ball-shaped elements as well as large chunks and flakes.

Although the filling mechanism 92 may be of any desired type, including that disclosed in my prior Patent No. 2,113,636, granted Apr. 12, 1938, it has been found that most efficient operation can be obtained utilizing my prior developed filling mechanism which operates on a differential gaseous pressure principle and which provides for the even compaction of a finely divided material whereby like weights of material can be placed within identical volumes with very uniform accuracy. Reference is made to my co-pending application Ser. No. 299,696, filed Aug. 5, 1963, now Patent No. 3,260,285, which discloses a filling mechanism which may be utilized as the filling mechanism 93. However, in lieu of the filling mechanism filling a container of the rigid type, the filling mechanism may be utilized with the nozzle 100 functioning as a measuring sleeve of a predetermined volume whereby accurate weights of material may be deposited into the bags B or as a conduit for preweighed charges.

It is to be noted that an illustrated filling mechanism 93 includes an upper valve 101 which is directly connected to the conduit 92 and which is in the form of a shut-off valve controlling the flow of material down into a magazine 102. The valve 101 is closed when filling under positive pressure takes place. The nozzle 100 has incorporated in the upper part thereof a conical valve which is quick acting and which serves to control the flow of material into the lower part of the nozzle 100. Also, in the upper part of the nozzle 100 there will be the necessary filter and flow passages.

When the filling mechanism 93 is of the differential gaseous pressure type, the lower end of the nozzle 100 will be configurated to tightly engage and form a seal with the bag bottom 47. Reference is made to FIGURE 5 wherein it is shown that the lower end of the nozzle 100 may be provided with a gasket 103 for effecting the necessary seal. At this time it is pointed out that even though the filling of the bag B may be by means of a vacuum, it is not necessary to provide any hold-down for the bag bottom 47 in that the upwardly extended position shown in FIGURE 5 is a maximum upward position for the bag bottom and vacuum within the nozzle 100 will have no effect whatsoever thereon. On the other hand, the bag support 57 serves to prevent any downward movement of the bag bottom 47.

It is to be understood that no matter what type of filling mechanism is utilized, it is desired to fill from the bottom of the bag upwardly in order to avoid dust and to provide for controlled flow. In order to accomplish this, it is to be noted that a central portion of the cam track 67 is upwardly offset so that when an open bag comes into alignment with a nozzle 100, the bag is elevated and assumes the necessary position with respect to the nozzle 100. After the nozzle has been filled with the predetermined quantity of material, the bag B is lowered while it continues to move with the nozzle 100 and the material within the nozzle 100 flows into the bag against the bottom of the bag and fills the bag from the bottom up, as is desired.

It will be readily apparent that the disclosed apparatus overcomes the deficiencies of existing apparatus. In view of the fact that the bag forming apparatus 21 is vertically disposed, it will be readily apparent that a minimum amount of floor area is required for the forming of the bags. Furthermore, since there must be a transfer of the bags from the vertical to the horizontal and since this can be accomplished along an arc, it will be seen that the necessary increase in spacing between the bags is readily obtainable without any special speed-up mechanism.

It will also be readily apparent that the apparatus 20 is not limited as to size of bag or weight of materials contained within the bag. The bags, when filled, as well as during the filling operation, are supported at their bottoms by the bag supports 57 and therefore at no time is there any undue force on the mechanism of the carrier 54 which will limit the size of bag or the weight of material placed therein. Further, since there will be no distortion of the bags, there will be no problem of sealing the bags after the filling thereof.

Although only a preferred embodiment of the invention has been specifically illustrated and described herein, it will be readily apparent that minor variations may be made within the bag filling apparatus and the method of utilizing the same within the scope and spirit of this invention, as defined by the appended claims.

I claim:

1. A method of forming a bag from a continuous moving web comprising the steps of longitudinally shaping the web to be of a generally U-shape and including a reversely turned portion and two panel portions, placing a first former within the confines of the shaped web and exteriorly positioning a second former in cooperation with the first former to clamp the reversely turned web portion therebetween and define a bag bottom, transversely sealing together the web panel portions on opposite sides of the first former, and severing the formed bag from the remainder of the web.

2. A method of forming a bag from a continuous moving web and filling the bag comprising the steps of longitudinally shaping the web to be of a generally U-shape, and including a reversely turned portion and two panel portions, placing a first former within the confines of the shaped web and exteriorly positioning a second former in cooperation with the first former to clamp the reversely turned web portion therebetween and define a bag bottom, transversely sealing together the web panel portions on opposite sides of the first former, severing the formed bag from the remainder of the web, and then transferring the bags from the first formers to a filling mechanism.

3. A method of forming and filling bars comprising the step of providing a folded open web moving generally in a vertical path; shaping, sealing and severing the web at vertically spaced intervals to define a plurality of generally horizontally disposed open bags, transferring the bags to a generally horizontal path of movement while holding the bags open and then filling the open bags.

4. A method of forming and filling bags comprising the step of providing a web moving generally in a vertical path; shaping, sealing and severing the web at vertically spaced intervals to define a plurality of generally horizontally disposed open bags, transferring the bags to a generally horizontal path of movement while holding the bags open, then filling the open bags, reshaping the bags, and sealing the bags closed.

5. A method of forming a bag from a continuous moving web comprising the step of longitudinally shaping the web to be of a generally U-shape and including a reversely turned portion and two panel portions, placing a first former within the confines of the shaped web and exteriorly positioning a second former in cooperation with the first former to clamp the reversely turned web portion therebetween and define a bag bottom, transversely sealing together the web panel portion on opposite sides of the first former, severing the formed bag from the remainder of the web, releasing the second former from the bag bottom with the bag being supported solely by the first former, then engaging the bag bottom by a carrier, and withdrawing the bag from the first former while holding the bag open.

6. A method of forming a bag from a continuous moving web comprising the step of longitudinally shaping the web to be of a generally U-shape and including a reversely turned portion and two panel portions, placing a first former within the confines of the shaped web and exteriorly positioning a second former in cooperation with the first former to clamp the reversely turned web portion therebetween and define a bag bottom, transversely sealing together the web panel portions on opposite sides of the first former, severing the formed bag from the remainder of the web, releasing the second former from the bag bottom with the bag being supported solely by the first former, then engaging the bag bottom by a carrier, withdrawing the bag from the first former while holding the bag open and generally upright, and then filling the bag while supported by the carrier.

7. A compact bag forming and filling machine comprising a vertical bag forming unit and a horizontal bag filling unit, said bag filling unit being disposed immediately adjacent to said bag forming unit and having means for receiving bags therefrom, said bag forming unit comprising guide means for guiding a continuous web of a generally U-shaped cross-sectional configuration, continuously moving first formers having a path of movement including a run along which the formers are received within the web, continuously moving second formers having a path of movement including a run along which said second formers are aligned with and opposed to said first formers passing along said first former run with said second formers being disposed exteriorly of the web, said first formers and said second formers having complementary end portions cooperable to shape the web to define bag bottoms and means for sealing together the web on opposite sides of said first formers passing along said first former run and severing the formed bags from the web.

8. A compact bag forming and filling machine comprising a vertical bag forming unit and a horizontal bag filling unit, said bag filling unit being disposed immediately adjacent to said bag former unit and having means for receiving bags therefrom, said bag forming unit comprising guide means for guiding a continuous web of a generally U-shaped cross-sectional configuration, continuously moving first formers having a path of movement including a run along which the formers are received within the web, continuously moving second formers having a path of movement including a run along which said second formers are aligned with and opposed to said first formers passing along said first former run with said second formers being disposed exteriorly of the web, said first formers and said second formers having complementary end portions cooperable to shape the web to define bag bottoms, and continuously moving web sealing means disposed in two cooperating sets moving in timed relation to the movements of said first and second formers, and said web sealing means being supported for movement along paths each of which includes a run disposed adjacent to said former runs whereby said web sealing means will engage the web intermediate said first formers to shape the web around said first formers and seal off separate bag forming portions.

9. The bag forming and filling machine of claim 8 wherein said first and second formers and said web sealing means are carried by endless conveyor members.

10. The bag forming and filling machine of claim 8 wherein said first and second formers and said web sealing means are carried by endless conveyor members, the endless conveyor members of said web sealing means lying in a plane disposed normal to the plane of the endless conveyor members of said formers.

11. The bag forming and filling machine of claim 8 together with web severing means for severing the sealed web between said first formers to separate formed bags from the remainder of the web with the formed bags being carried by said first formers.

12. A compact bag forming and filling machine comprising a vertical bag forming unit and a horizontal bag filling unit, said bag filling unit being disposed immediately adjacent to said bag forming unit and having means for receiving bags therefrom, said bag forming unit comprising guide means for guiding a continuous web of a generally U-shaped cross-sectional configuration, continuously moving first formers having a path of movement including a run along which the formers are received within the web, continuously moving second formers having a path of movement including a run along which said second formers are aligned with and opposed to said first formers passing along said first former run with said second formers being disposed exteriorly of the web, said first formers and said second formers having complementary end portions cooperable to shape the web to define bag bottoms, means for sealing together the web on opposite sides of said first formers passing along said first former run and severing the former bags from the web with the former bags being carried by said first formers, and said bag filling unit including a plurality of continuously moving carriers having a path of movement of which a part generally coincides with the path of movement of said first formers and said carriers having bag bottom engaging end portions similar in shape to said second former end portions to maintain the shape of bags, and means associated with each carrier for removing a bag engaged by the carrier from the associated first former.

13. A bag forming and filling machine comprising a vertically disposed bag forming mechanism, a vertical axis turret type filler disposed adjacent said bag forming mechanism, a plurality of bag carriers for receiving bags from said bag forming mechanism and moving the bags in cooperative relation to said turret type filler, and an endless conveyor capable of flexure simultaneously in two directions at right angles to one another supporting said carriers.

14. A bag forming unit comprising guide means for guiding a continuous web of a generally U-shaped cross-sectional configuration, continuously moving first formers having a path of movement including a run along which the formers are received within the web, continuously moving second formers having a path of movement including a run along which said second formers are aligned with and opposed to said first formers passing along said first former run with said second formers being disposed exteriorly of the web, said first formers and said second formers having complementary end portions cooperable to shape the web to define bag bottoms, and means for sealing together the web on opposite sides of said first formers passing along said first former run and severing the formed bags from the web.

15. A bag forming unit comprising guide means for guiding a continuous web of a generally U-shaped cross-sectional configuration, continuously moving first formers having a path of movement including a run along which the formers are received within the web, continuously moving second formers having a path of movement including a run along which said second formers are aligned with and opposed to said first formers passing along said first former run with said second formers being disposed exteriorly of the web, said first formers and said second formers having complementary end portions cooperable to shape the web to define bag bottoms, and continuously moving web sealers disposed in two cooperating sets moving in timed relation to the movements of said first and second formers, and said web sealers being supported for movement along paths each of which includes a run disposed alongside a respective one of said former runs whereby said web sealers will engage the web intermediate said first formers to shape the web around said first formers and seal off separate bag forming portions.

16. A carrier for transporting an open bag and supporting the bag during the filling thereof, said carrier including a bag support having an upper surface contoured to provide face-to-face engagement with a bag bottom whereby the weight of a product placed in an associated bag is directly transmitted to said bag support, and bag retaining means carried by said bag support for movement therewith, said carrier being particularly adapted for use with a bag having a recessed concavely curved bottom and said bag support having upper surface means contoured to retain the bag bottom in a stretched state whereby the bag is retained in an open state.

17. A compact bag forming and filling machine comprising a vertical bag forming unit and a horizontal bag filling unit, said vertical bag forming unit including means to form a plurality of generally horizontally disposed open bags and to transfer the bags to a generally horizontal path of movement towards said bag filling unit, said bag filling unit being disposed immediately adjacent to said bag forming unit and having means for receiving bags therefrom, a bag reformer for receiving filled bags and effecting the reshaping thereof to facilitate the final sealing of bags, and a bag sealer for receiving moving bags reformed by said bag reformer.

18. A bag forming and filling apparatus comprising a vertically disposed bag forming unit and an adjacent bag filling unit, said bag forming unit being particularly adapted to receive a continuous web and serially form individual bags therefrom in immediately adjacent relation and including internal formers about which bags are shaped and which carry formed bags separated from the web, and conveyor means for transferring bags from said bag forming unit to said filling unit, said internal formers being mounted for movement about an arcuate path at the time of transfer to said conveyor means whereby the spacing between adjacent bags is automatically increased.

19. The apparatus of claim 18 wherein said internal formers have extensible end portions whereby the spacing of bags at the time of transfer may be increased.

20. A carrier for transporting an open bag and supporting the bag during the filling thereof, said carrier including a bag support having an upper surface contoured to provide face-to-face engagement with a bag bottom whereby the weight of a product placed in an associated bag is directly transmitted to said bag support, and bag retaining means carried by said bag support for movement therewith, said carrier being particularly adapted for use with a bag having a curved bottom and said bag support having upper surface means contoured to retain the bag bottom in a curved state whereby the bag is retained in an open state.

References Cited

UNITED STATES PATENTS

| | | | |
|---|---|---|---|
| 1,469,083 | 9/1923 | Harding et al. | 53—135 |
| 1,914,369 | 6/1933 | Hohl | 53—187 |
| 2,475,617 | 7/1949 | Irmscher | 53—33 X |
| 2,564,969 | 8/1951 | Goldberg. | |
| 2,649,673 | 8/1953 | Bartlet | 53—180 |
| 2,923,111 | 2/1960 | Selock | 53—187 X |
| 2,643,496 | 6/1953 | Cloud | 53—183 |
| 3,028,796 | 4/1962 | Nevendorf et al. | 53—192 X |
| 3,041,941 | 7/1962 | Danielzig | 53—29 |
| 3,197,936 | 8/1965 | Messmer | 53—187 X |
| 3,242,630 | 8/1966 | Danielzig et al. | 53—29 |
| 3,264,794 | 8/1966 | Brown et al. | 53—29 |

FOREIGN PATENTS

| | | |
|---|---|---|
| 908,739 | 10/1962 | Great Britain. |
| 1,281,258 | 12/1961 | France. |

WILLIAM W. DYER, JR., *Primary Examiner.*

N. ABRAMS, *Assistant Examiner.*